(12) United States Patent
Van Gelder (10) Patent No.: US 8,152,130 B1
(45) Date of Patent: Apr. 10, 2012

(54) PROCESS AND HARDWARE FOR MAKING A MESSAGE CARRYING COOKIE AND THE COOKIE ITSELF

(76) Inventor: Timothy J. Van Gelder, Elk Grove, CA (US)

( * ) Notice: Subject to any disclaimer, the term of this patent is extended or adjusted under 35 U.S.C. 154(b) by 989 days.

(21) Appl. No.: 12/150,007

(22) Filed: Apr. 25, 2008

(51) Int. Cl.
*A21C 11/12* (2006.01)

(52) U.S. Cl. ........ 249/119; 249/124; 249/125; 249/129; 249/142

(58) Field of Classification Search .............. 249/63–64, 249/67, 70, 91–94, 96, 114.1, 115, 119, 120, 249/122–125, 139, 142, 147, 151, 176, 177, 249/186, 129; 425/117, 118, 123, 126.1, 425/126.2, 121, 127, 195, 253, 256, 441, 425/466–468, 438; 426/91, 134, 143; 99/428
See application file for complete search history.

(56) References Cited

U.S. PATENT DOCUMENTS

| | | | | |
|---|---|---|---|---|
| 1,975,031 A * | 9/1934 | Wilkes et al. | .................... | 426/27 |
| 2,003,517 A * | 6/1935 | Schnaier | ..................... | 294/87.11 |
| 2,222,112 A * | 11/1940 | Miller | ............................ | 249/176 |
| 2,503,318 A * | 4/1950 | Bienert | ......................... | 249/125 |
| 2,661,518 A * | 12/1953 | Carlson | .......................... | 264/334 |
| 2,687,081 A * | 8/1954 | Tucker | ............................ | 249/125 |
| 2,937,092 A * | 5/1960 | Zitin | ................................ | 426/92 |
| 2,966,127 A * | 12/1960 | Logan | ............................... | 249/67 |
| 3,158,087 A * | 11/1964 | Hedglin | .......................... | 99/428 |
| 3,379,120 A * | 4/1968 | Fogle | ............................. | 425/346 |
| 4,190,229 A * | 2/1980 | Bradshaw | ..................... | 249/124 |
| 4,560,139 A * | 12/1985 | Dahlke | ......................... | 249/112 |
| 4,969,811 A * | 11/1990 | Littleton | ....................... | 425/116 |
| 6,505,809 B1* | 1/2003 | Reed | ................................ | 249/95 |
| 6,540,200 B2* | 4/2003 | Afolabi | ....................... | 249/66.1 |
| 7,849,787 B2* | 12/2010 | Flores | ............................. | 99/353 |

FOREIGN PATENT DOCUMENTS

DE 3306138 A1 * 8/1984
JP 04016147 A * 1/1992

* cited by examiner

*Primary Examiner* — Dimple Bodawala
(74) *Attorney, Agent, or Firm* — Tim Van Gelder (57) ABSTRACT

An apparatus for baking a plurality of bore containing cookies for the insertion of a message post baking. One embodiment also provides for the simultaneous baking of flat cookies. The apparatus integrates a pan with wall slots, a mold having a plurality of shape makers each with an opening in one end, and a U-frame having a series of spaced aligned pins, the spacing of which corresponds to the spacing of the openings of the plurality of shape makers. One embodiment provides for the simultaneous baking of flat cookies in spaces defined by adjacent and opposed shape makers. The mode of assembly of the components as part of a baking process and the formed cookies are also disclosed.

16 Claims, 6 Drawing Sheets

PROCESS AND HARDWARE FOR MAKING A MESSAGE CARRYING COOKIE AND THE COOKIE ITSELF

FIELD OF THE INVENTION

This application pertains to a message carrying cookie and the process for making same using a special apparatus.

BACKGROUND OF THE INVENTION

Fortune cookies are well known in the Chinese Restaurant Community. These are flat pieces of dough which are folded over, by man or machine, to seal them up, and a message is manually inserted therein. The dough used is a flat dough that resembles one layer of phyllo dough. Several patents have been found that relate to cookies of one type or another which are capable of carrying a message. Some of the patents that turned up during the course of a patent search include:

| PATENT # | INVENTOR | DATE |
| --- | --- | --- |
| 0,229,163 | Mills | Jun. 22, 1880 |
| 1,936,835 | Fairchild | Nov. 28, 1933 |
| 2,003,578 | Clement | Jun. 4, 1935 |
| 3,265,016 | Cheung | Aug. 9, 1966 |
| 3,410,691 | Stanley | Nov. 12, 1968 |
| 4,752,493 | Moriki | Jun 21, 1988 |
| 4,797,291 | Pierce et al. | Jan. 10, 1989 |
| D0,315,435 | Kirkpatrick | Mar. 19, 1991 |
| D0,361,735 | Baker | Mar. 10, 1998 |
| D0,444,613 | Amico | Jul. 10, 2001 |
| D0,475,173 | Frazee | Jun. 3, 2003 |
| 6,780,453 | Smith | Aug. 24, 2004 |

None of these patents, however, relate to the process or the hardware of the instant invention, and none of them create a cookie where the dough has risen, yet alone an opening is present, for the insertion of a paper carrying a message.

SUMMARY OF THE INVENTION

A process for making a cookie that rises during baking, on a mass production level, which cookie is capable of receiving a message to be inserted therein subsequent to baking. The process utilizes a standard butter cookie dough placed into a mold, wherein the dough rises around a bore creator pin, which bore creator, upon removal, leaves a bore in the cookie for message insertion. Molds of the desired shape have a bore on one end to receive a bore creator pin. After a layer of dough is inserted into the mold, the bore creator pin is inserted into the mold, more dough added, and the baking process is carried out. Subsequent to cooling, the pin is removed, leaving a bore for manual or automatic message insertion. Any shape mold may be employed so long as the bore is present to receive the removable pin.

It is a first object, therefore, to prepare a unique combination of hardware elements to prepare cookies that have a bore therein to receive a message.

It is a second object of this invention to provide an apparatus for the easy preparation of a multiplicity of specific shaped cookies.

It is a third object to provide an apparatus for the manufacture of cookies into which a message can be inserted for easy removal.

It is a fourth object to provide a method for the manufacture of message bearing cookies.

It is a fifth object to provide a method for the manufacture of cookies of a specific configuration.

It is a sixth object to provide an apparatus for the manufacture of cookies into which a message can be inserted, and simultaneously prepare non-message carrying flat cookies as well.

Other objects of the invention will in part be obvious and will in part appear hereinafter.

DESCRIPTION OF THE PREFERRED EMBODIMENT

Figure 1:
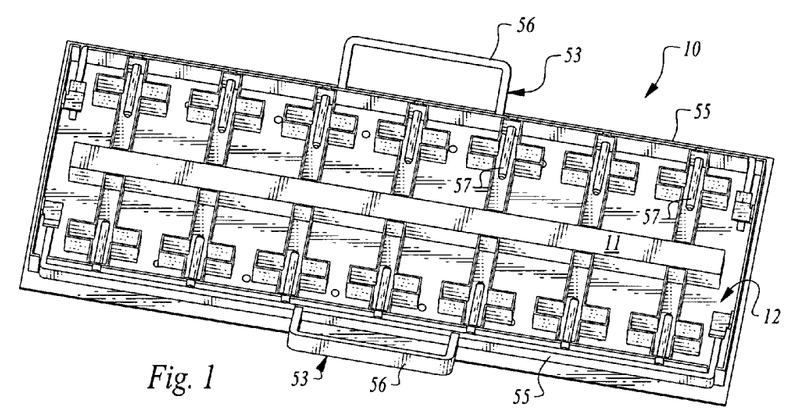
FIG. 1 is a top perspective view of this invention.

In FIG. 1, the entire hardware aspect of the invention is seen. Of course, this does not show the process, which will be discussed relative to FIG. 12.

Figure 2:
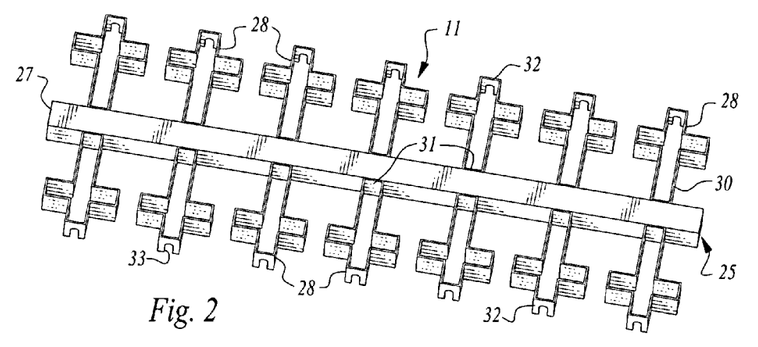
FIG. 2 is a top perspective view of the mold, or dough holder portion, of this invention.

This invention comprises three main portions; the mold, or dough former, 11, comprising a long arm, 27, per FIG. 2, which has a plurality of shape configuration sections, also known as shape makers, 28, attached to it. The second portion is the pan or tray, 12, into which the dough former, 11, rests. The third portion is the bore maker, 53, which serves to create a cavity or opening in the cookie to be baked such that a message can be inserted therein subsequent to the baking and cooling steps. All of these portions will be discussed separately.

In FIG. 2, the dough holder is seen by itself. Long arm, 27, is a preferably stainless steel square tube sealed on the ends of a finite length. Anodized aluminum, a non-pitting aluminum alloy, or other food grade metal may also be employed for not only the long arm but for all metal parts of the invention. On both sides of the square tube, 27, evenly spaced apart along the length thereof, are a series of shape makers or individual molds, 28, into which dough is to be placed. In the drawings, a Christian Cross is shown. Other shapes include, but are not limited to, a Jewish star, a Greek Cross, and an ankh, among other religious symbols. But social service organization indicia such as an Elk or Moose, or the Girl Scout's emblem configuration are but a few of the multitude of shapes that can also be employed as a dough holder. It is also to be noted that while all of the shape configurations, 28, are seen here to be the same, it is within the scope of the invention to have different shapes or configurations attached to the long arm, 27. For example, mention may be made of an egg and the Easter Bunny. Whatever shape is chosen, the distal and proximal ends are to be made as described infra.

Figure 10:
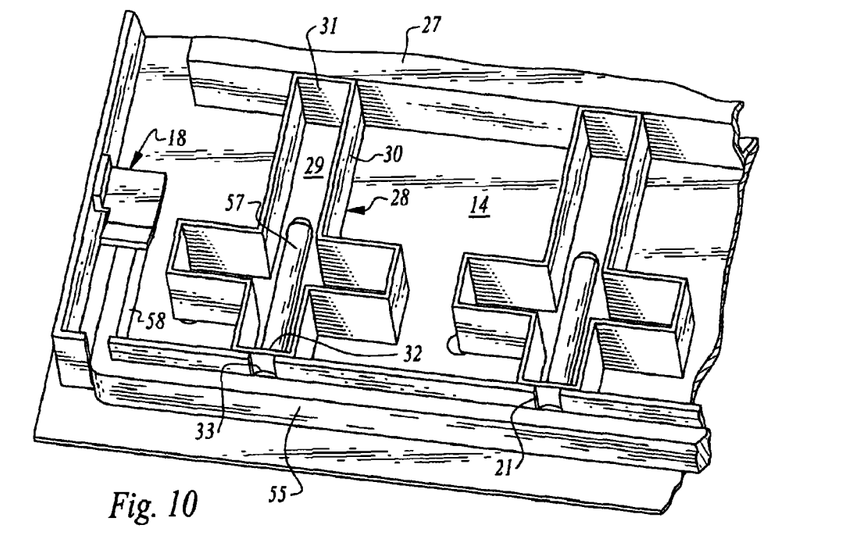
FIG. 10 is a closeup perspective view of a section of the mold in the pan, with the bore creator pin shown disposed in the two mold shapes of the mold or dough holder.

For ease of understanding, reference should also be made to FIG. 10 at the same time, as only two of the sixteen shape makers of FIG. 2 are seen. Cross shape maker, 28, has a proximal end, 31, that is a solid member having a finite depth, preferably matching that of the elevation of the long arm, 27. All the other walls of the cross, 28, are also of the same depth. These include the side walls, 30, and the distal end wall, 32. The end walls, 31, 32, and the side walls, 28, are all attached to bottom wall, 29, either through a sheet metal folding process or by being welded into place, normal to said base, 29. Sheet metal forming on a brake is preferred. Each distal wall, 32, has a preferably central throughbore, 33. As will be explained, the throughbore is for the pin, 57, seen in FIG. 10, to pass through. Thus, care must be taken to align the pin with the throughbore location during construction of the respective portions of this invention.

In FIG. 2, seven shape makers, 28, are seen on each side. However, there is no criticality to the number of shape makers, which can vary from one to twenty or more. The controlling factor will be the availability of pans and the depth of one's oven for baking.

Figure 3:
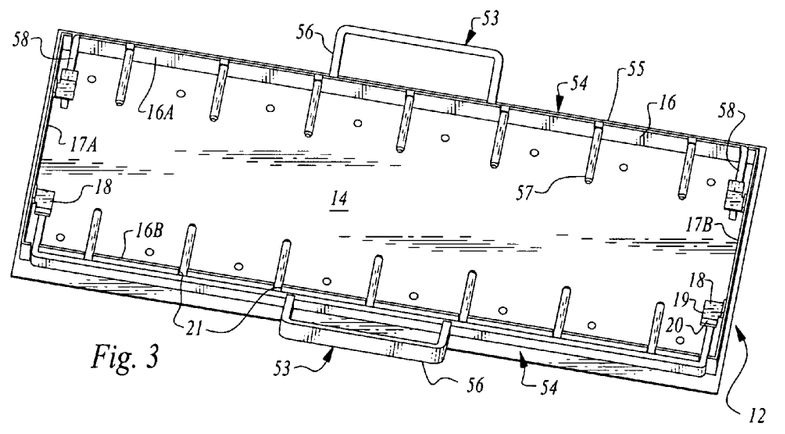
FIG. 3 is a top perspective view of the pan portion with the bore creator disposed therein, but without the mold portion.

In FIG. 3, only the pan (tray) portion, 12, and the bore maker, 53, are seen. Bore maker, 53, is shown disposed upon the pan, 12. Bore maker, 53, includes a U-frame, 54, having an elongated section, 55, to which is attached a centrally disposed handle, 56. The integrally formed spaced end members are designated U-frame arms, 58. These may be of the same or lesser extension than the pins, 57, used to make the cookie's bore. As noted earlier, this component is also preferably made of stainless steel. Spaced evenly along the length of the elongated member, 55, which is formed of bar stock, are a series of cylindrical pins, 57, of a finite length mounted normal to the elongated member, 55. Note that the arms, 58, of the U-frame need not be of the same extension as the pins there between. Note also that the handle is preferably disposed at an upward angle of about 30 to 45 degrees for ease of placement into the pan, though a handle extending straight out from the elongated member is also contemplated by this invention. See FIG. 9 as well. As seen in FIG. 10, the length of the pin is more than 50% of the depth between the distal and proximal ends of each shape maker. Reference may also be made to FIG. 9 again, which illustrates the bore maker, 53, as a sole portion.

Figure 4:
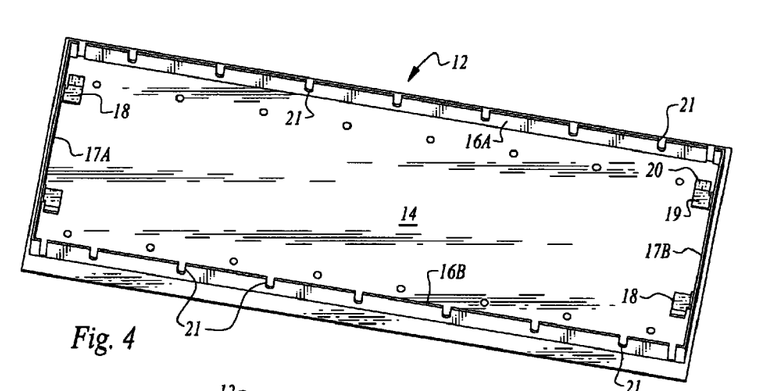
FIG. 4 is top perspective view of the pan alone, forming a portion of this invention.

The pan or tray, 12, is seen in FIG. 3 with the bore maker in engagement, but is seen alone in FIG. 4. The tray, 12, has a quadrilateral, here rectangular, base, 14, from which emanates spaced front and rear walls, 16A, 16B, disposed normal to said base, 14, and spaced end walls, 17A and 17B, also disposed normal to said base, 14, and to the front and rear walls aforementioned.

Both of the front and rear walls, 16A, 16B, have a series of spaced downward extending slots, 21, whose locations are seen to correspond to the spacing of the pins of the bore maker as can be seen in FIG. 3. When the bore maker, 53, is disposed in the pan, 12, the pins are supposed to align with the slots, 21, of said pan.

At opposite ends of each end wall and in a suitable location there, are disposed four retainers, 18, adapted to retain the side arms, 58, of the U-frame. See again FIG. 3. These retainers, 18, have a larger rectangular section, 19, disposed parallel to and spaced from the base, 14, of said pan. At the proximal end of each section, 19, is an upstanding smaller section, 20. As can be seen in FIG. 3, these retainers prevent the bore maker from tipping down such that its pins are disposed upwardly on an angle and thus not properly located. Again see FIG. 3, as well as FIG. 7, where the closeup view reveals the presence of the attachment section, 23, joined to section, 19, and attached as by welding to the side wall, 17B, of the pan, at weld, 22. Retainer, 18, may be formed by conventional metal bending and cutting techniques.

Figure 5:
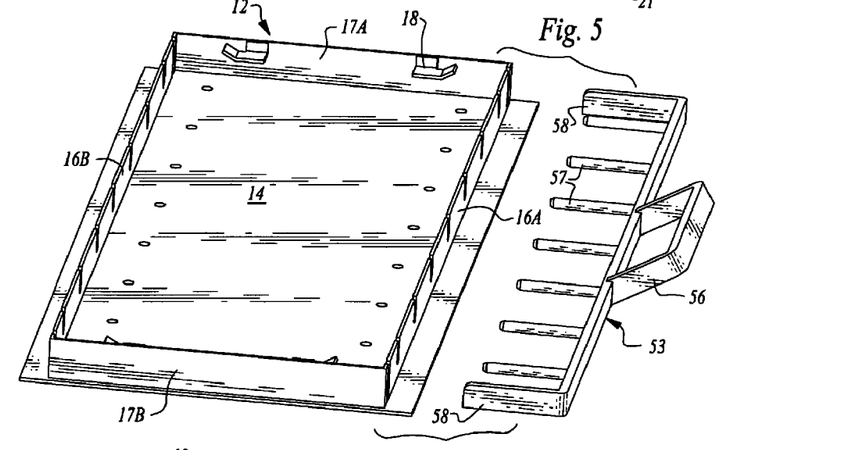
FIG. 5 is a side perspective view of the pan and bore creator, disengaged from the pan.

Disposed along the length of the front and rear walls, 16A and 16B, are found a series of spaced downwardly disposed slots, 21, for receipt of the pins, 57, of the bore maker. Again, see FIG. 3, as well as FIG. 5. When the bore maker is disposed in the tray as per FIG. 5, each pin preferably rests at the bottom of its respective slot. Since the slots are open at the top, the weight of the handle would counter-rotate the pins upwardly but for the presence of the retainers, 18, which act to keep the U-shaped frame tight up to the front and rear walls of the tray, 12, and the pins horizontally disposed.

Figure 6:
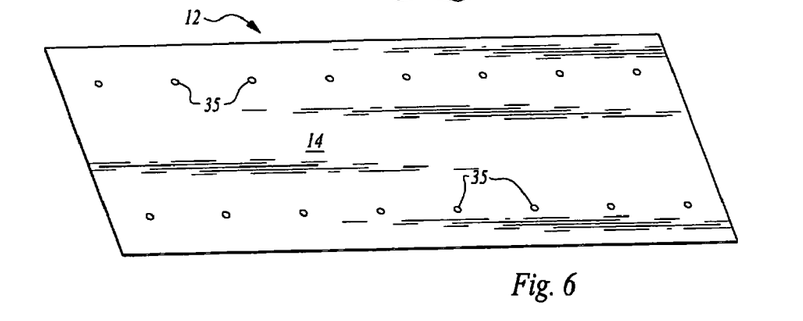
FIG. 6 is a bottom perspective view of the pan alone.

FIG. 6 is bottom plan view of the tray, 12. Note that the base, 14, is wider than the rectangle defined by the four walls, 16A and 16B, and, 17A and 17B. The dots seen, 35, are weld points for the attachment of the front and rear walls. This extra extension is seen as well in FIG. 5. This extra material serves as a possible rest area for each of the two handles of the bore maker, as well as a location to catch any excess dough for an easier cleanup.

Figures 7, 8, 9:
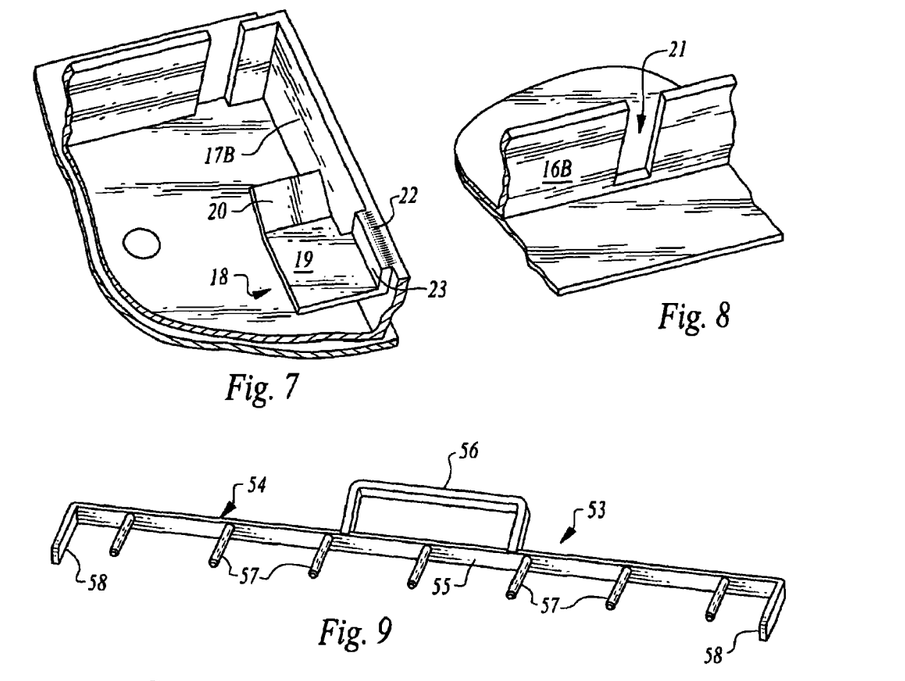
FIG. 7 is a closeup view of one element of the pan portion.
FIG. 8 is a closeup view of a second element of the pan portion.
FIG. 9 is a perspective view of the bore creator portion of the invention.

FIG. 7 has already been discussed. FIG. 8 is another closeup view, this time of an area of one of the sidewalls, 16B, of the pan, 12. Here an individual slot, 21, is seen extending almost the full depth of the sidewall. FIG. 9 has also been previously discussed. Now, the discussion revisits FIG. 10.

As has already been mentioned, the pin, 57, is seen disposed in the slot of the sidewall and in the bore, 33, of each shape maker, 28. While this view shows the inter-engagement of the parts, in reality, the engagement is only carried out AFTER the shape maker has received a layer of dough as will be explained infra. Thus, FIG. 10 is not a true depiction of the process. Reference should therefore be made to FIG. 11 for the process and to FIG. 12 for the cookie made in the hardware by the process of this invention.

Figure 13:
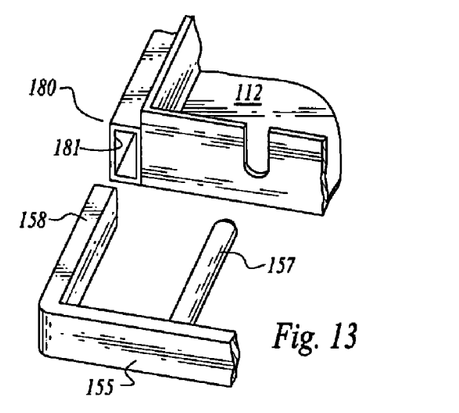
FIG. 13 is a cutaway left side perspective view of a variant of one aspect of the pan portion and the U-frame aspects of this invention.

However, prior to discussing the process, there are some points that are to be brought to the reader's attention. Thus, reference is made to FIG. 13. This view illustrates an alternate means for retaining the pins in proper alignment to make straight bores in the cookie dough. This view is a cutaway top perspective view of one left corner of the pan. In contrast to the retainers, 18, seen in FIGS. 3, 4, and 7, which are disposed inside the pan, the variant tray 112, is seen to have a rectangular tube shaped member, 180, having an interior slot, 181, sized slightly larger than the arm, 158, of a slightly longer U-frame, 155. The same type of arm may be integrally formed of the bar stock used to make the balance of the U-frame, here designated, 155, due to the extra length. The pins, while designated 157 for consistency of nomenclature, are the same pins as pins, 57.

Figure 14:
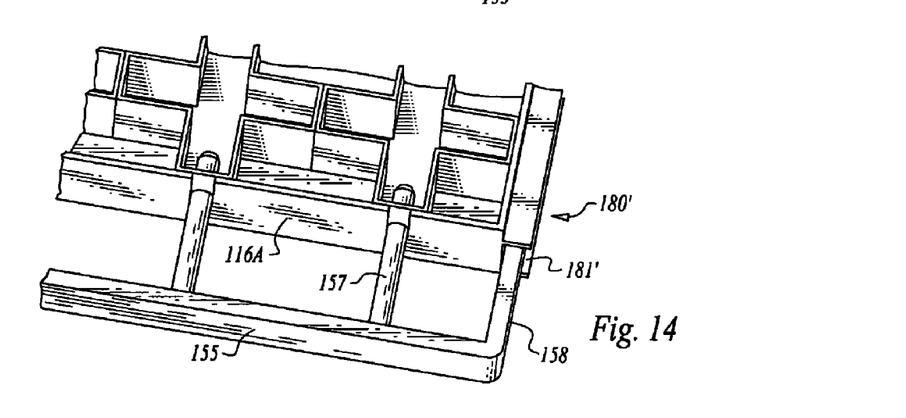
FIG. 14 is a right top perspective view of the variant of FIG. 13.
Figure 19:
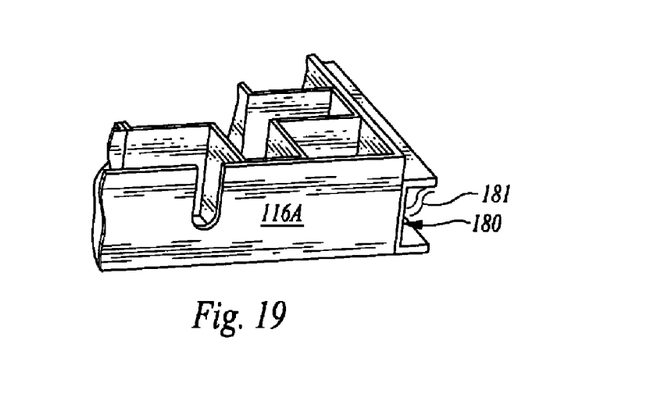
FIG. 19 is an elevational view related to FIG. 14.

Reference is now made to FIG. 14 which illustrates the insertion of arms, 158, into channel, 180', which channel is open on its exterior surface, 181', as can also be seen in FIG. 19 wherein designator 116A is the front wall of the pan. Contrast this with FIG. 13, which uses a closed end means to retain the arms, 158. Both arm retainer means are interchangeable as may be desired.

The discussion now turns to FIGS. 15, 16, 17, and 18, which pertain to a second embodiment related to the variant discussed supra. In this second embodiment, 100, numbers in 100 series carrying the same two last digits as discussed in the first embodiment, pertain to similar parts as found in the first embodiment or in the variant of FIGS. 14 & 19.

Thus the second embodiment of the cookie forming tray, 100, is seen to include a tray, 112, and a mold or dough former, 111. The dough former, 111, can also be called a dough holder since the dough resides within the plurality of sections where it, the dough takes its shape during the baking process. Thus the bore maker, 153, has a U-shaped frame, 155, to which is attached a handle, 156. Hereto the handle, 156, is seen to be slightly elevated from the horizontal to render insertion and removal of the bore maker, 153, from the tray, 112, and dough holder, 111. Here too, the bore maker, 153, has a series of spaced pins, 157, each and all of which are aligned with openings in the front and back walls of the tray, 112. Bore maker, 153, has arms of the same nature as the arms of the bore maker, 53, however, these are spaced further apart in order to fit into the outboard retainers, 180'. See FIG. 14 or FIG. 16.

Figure 16:
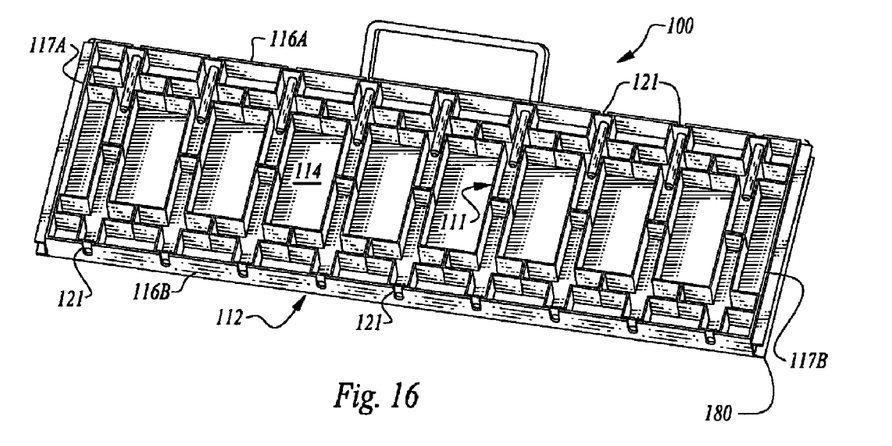
FIG. 16 is a top perspective view of the second embodiment of this invention, with only one of the U-frames inserted into position.

In FIG. 16, the second embodiment of this invention is seen, but with only one of the two bore makers inserted into the tray, 112, and the mold, 111. Tray, 112, is substantially similar to tray, 12, in that it has spaced front and rear walls, 116A and 116B, each having a series of aligned spaced slots, 121. The tray, 112, also has spaced side walls, 117A and 117B, that are upstanding and normal to the aforementioned front and rear walls and to the base, 114. As can be seen the spacing of the pins, 157, of the bore maker is equal to the spacing of the slots, 121, in the front and rear walls of the tray, 112.

Figure 15:
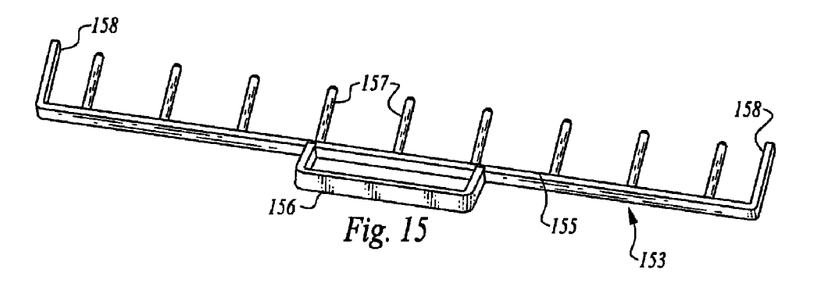
FIG. 15 is a top perspective view of U-frame of the variant, which U-frame is also one portion of a second embodiment of this invention.

Whereas the bore maker of FIG. 1 has 7 laterally spaced pins, the bore maker of this FIG. 15 has 9 pins. It is to be seen that the pin spacing can vary with the shape of the cookie to have a message therein, and can vary in number from about 5 to 12 pins. The larger the number of pins, the greater the extension of the tray. This could cause a problem for certain ovens that could be smaller in one internal dimension than the tray's extension.

Figure 17:
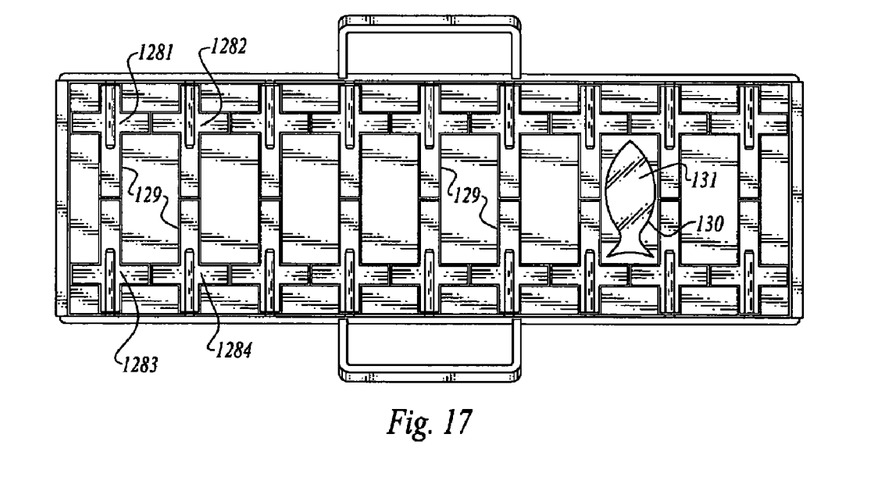
FIG. 17 is a top plan view of the second embodiment.
Figure 18:
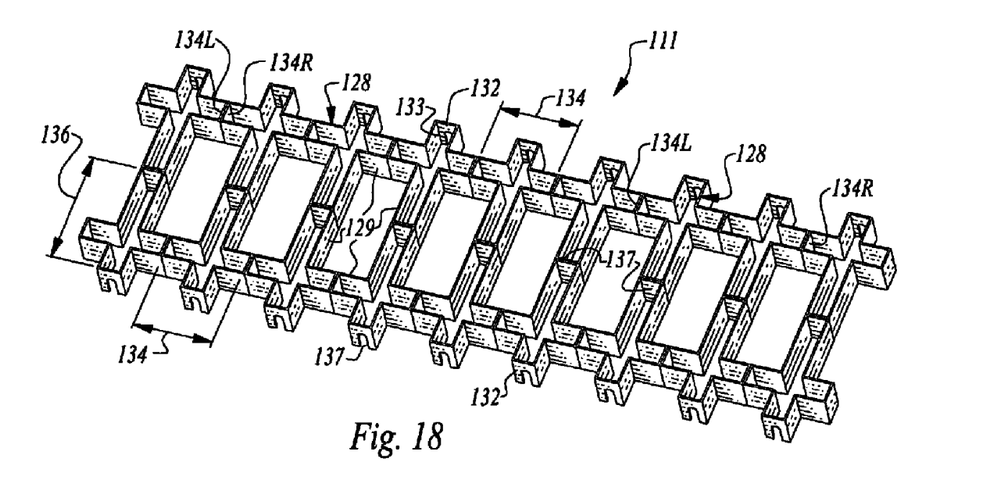
FIG. 18 is a top perspective view of the dough holder of the second embodiment.

Now contrast the configuration of the mold, 11, of FIG. 1 to the mold, 11, seen in FIGS. 16, 17 and 18. In FIG. 2, the mold of the first embodiment is seen to have a long central arm, 27, to which each cross shape individual mold is attached, and with each of the cross shaped shape makers, 28, being spaced from one another. The mold of the second embodiment is seen to have no central arm. See FIG. 18.

Here, 9 cross shaped individual molds, a.k.a. shape makers, 128, are set out laterally with the horizontal part, 134, of the plurality of crosses abutting one another. Thus the left wall, 134L, of each of the 9 crosses abuts and is connected as by welding or soldering, to the next adjacent cross's right wall, 134R. The vertical section of each cross shape maker is designated 136, and opposed crosses have their respective bases, 137, attached to each other as by welding or soldering. The positioning of each two adjacent crosses and each two opposed adjacent crosses designated 1281, 1282, 1283, and 1284 taken together define a rectangle, 129, which while not carrying a pin for the purpose of making a bore for the later insertion of a message, still defines a closed in area, 129, that can also be filled with dough to form a flat sheet (non-bore containing) cookie. See FIGS. 17 & 18.

Since the cookies to be prepared in this invention are intended for human consumption, the molds should be manufactured in stainless steel or a high heat resistant plastic of a food grade. Each defined rectangle, 129, may if desired, be further modified by the addition of more strips of stainless steel or the plastic material, 130, to change the shape of rectangular section, 129, into an internal new configuration, such as the fish, 131, shown in FIG. 17. Religious symbols of other religions of the world are also contemplated as shapes for the individual molds of this invention. Of course the molds of this invention are not to be considered as being limited to religious symbols. Any configuration that comes to mind may be employed for the message carrying molds, such as but not limited to a gingerbread man, a pumpkin for Halloween, a heart for Valentine's Day, and various animal shapes as well. The same is true for the flat cookie molds, any desired shape that can be configured may be employed.

Figure 11:
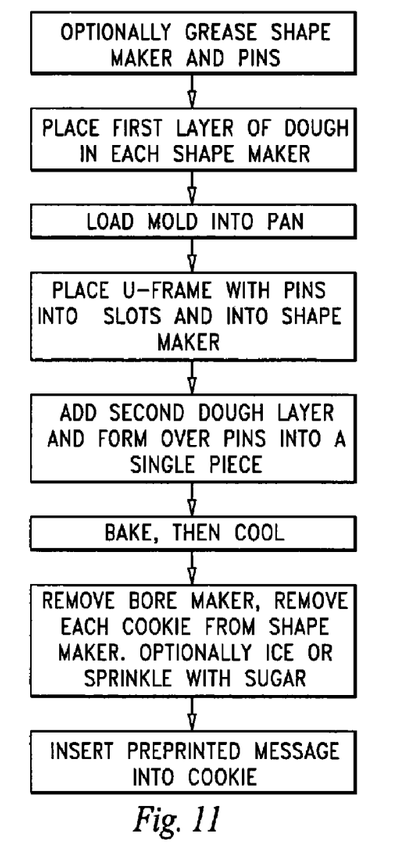
FIG. 11 is a graphical chart setting out the steps of the process aspect of this invention.

The Process:

The process of this invention is set out in FIG. 11.

1. Each of the shape makers, 28, is optionally greased with a lecithin spray such as PAM (brand) or brushed with Crisco (brand) shortening.
2. A suitable layer of dough is placed in the bottom of each of the shape makers, 28.
3. The mold is picked up by its elongated arm, 27, and placed into the pan, 12. Before doing so, each pin may also be greased in the manner previously recited.
4. The U-frame, 54, is carefully placed such that all pins, 57, fit within all of the slots, 21, of the pan.
5. Then a second layer of dough is tamped down over each of the pins and into all dough bearing sections, and tamped down onto the previously placed dough to form a single dough unit.
6. Depending upon the type of dough used, the assembled pan, mold and U-frame are placed in the oven and the dough permitted to bake at the recommended correct temperature for the predetermined time. These calculations are within the skill of the art of the home or business baker.
7. Upon completion of the baking cycle, the assembled invention is removed form the oven and allowed to cool.
8. The U-frame is then pulled backward out of the pan, the result of which is to leave a cookie with a bore therein in each of the shape makers, 28.
9. Each of the cookies is then removed from its shape maker. Each cookie may then be iced or covered with sugar, or another topping.
10. A pre-printed message may then be inserted manually into the bore of each cookie.

Note that for the non-message bearing cookies, either a single layer or two layers of dough may be employed. Since the dough is preferably placed in the pan in full sheets equal to the size of the pan, it is easier to utilize two layers of dough for the flat cookies as well, rather than having to cut away the second layer for each non-message bearing rectangle or other flat cookie shape.

Figure 12:
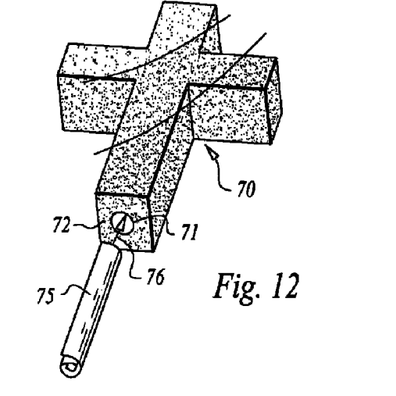
FIG. 12 is a perspective view of a finished baked cookie made in the hardware of this invention by the process of this invention.

Reference is now made to FIG. 12, which is a top perspective view of a Christian Cross shaped cookie, 70, having a bore, 71, in its distal end, 72, with a rolled up message, 75, about to be disposed in, and extending from, the cookie, per arrow, 76. By having the message extend out of the cookie, it may be removed easily for reading without having to bite down onto the cookie-message combination.

While the figures illustrate the use of similarly shaped shape makers on opposite sides of the mold, be they connected to a central arm or connected to opposed shape makers, the opposed shape makers may be minor images of the first at least one shape maker, or the opposed shape makers may be of an entirely different configuration, as may be desired. For example, two sets of opposed shape makers could be the reindeer, Dasher and Dancer, Prancer and Vixen.

The cookie baking dough can vary in density, texture, and ability to rise with certain types of dough. These different types of dough may be placed or rolled evenly into the entire empty (no mold or bore creator pin) greased pan, in one single layer. This one single layer of dough can be as thick as the two layer method.

With this one layer method, you then add and press the greased mold into the dough-filled pan. Then, insert the greased bore creator pin directly into the dough. You then can pull out the excess dough from any undesired baking areas. This method can work more efficiently and allow the dough to rise and bake in the desired mold areas and only around the bore creating pin, or one need not pull out the excess dough from the non-pin containing areas, in order to simultaneously bake flat cookies such as the rectangle or fish. Any suitable cookie dough formulation may be employed, the choice is within the skill of the art.

It is seen that I have provided two embodiments of an apparatus for baking message bearing cookies, which apparatus and the associated method have application to a broad range of religious, and social groups, such as to promote Breast Cancer Awareness—cookies in a ribbon configuration, and the Boy Scouts—symbol, as well as to private groups and individuals for birthday and holiday celebrations. One embodiment also provides for the baking of non-message bearing cookies at the same time, as a bonus.

Since certain changes may be made in the described apparatus and method, without departing from the scope of the invention herein involved, it is intended that all matter contained in the above description and shown in the accompany drawings, shall be interpreted as illustrative and not in a limiting sense.

I claim:

1. An apparatus for baking message receiving cookies, wherein said apparatus comprises:
   A. A baking pan having top, a flat bottom, and side walls, wherein each sidewall having a series of spaced equal slots therein extending upward from the bottom of the sidewalls;
   B. A mold sized to fit the pan, and having at least two shape makers, wherein each of said at least two shape makers having a base, which is attached to a side of a central arm, wherein each of said at least two shape makers having a distal end and a proximal end, said distal end having an opening therein for receipt of a pin; and has a defined open space between adjacent shape makers;
   C. A U-shaped frame having a series of spaced pins thereon, the pin spacing corresponding to the spacing of the slots of the sidewalls of the pan, each of said pins being disposed through said slots of said pan into said opening in said distal end of said at least two shape makers when said U-shape frame is in its in-use position, wherein said pins do not enter the defined open space between adjacent shape makers.

2. The apparatus of claim 1, wherein said pan includes a plurality of retainers for retaining said U-shape frame in a horizontal position.

3. The apparatus of claim 1, wherein each shape maker is configured as a Christian Cross.

4. The apparatus of claim 1 wherein at least one of the set of pins of the U-shaped frame and the shape makers are non-stick coated.

5. The apparatus of claim 1 wherein, in the mold, all shape markers are connected to an elongated member between opposite facing shape markers.

6. The apparatus of claim 1, wherein in the mold, the at least two shape makers are attached to a mirror image similarly shaped opposed shape maker.

7. The apparatus of claim 1, wherein in the mold, each of the at least two shape makers are attached to an opposed shape maker.

8. The apparatus of claim 7, wherein, in the mold, there are at least two shape makers laterally connected and said at least two shape makers are also connected to two opposed laterally connected shape makers.

9. The apparatus of claim 8, wherein, in the mold, the opposed shape makers are mirror image shape makers.

10. The apparatus of claim 1, wherein the total of at least four shape makers defined said open space in which a flat cookie can be baked.

11. The apparatus of claim 1, wherein each of said shape makers is configured as Greek cross.

12. The apparatus of claim 10, wherein the at least four shape makers are Christian crosses and the defined spaces for a flat cookie are rectangular.

13. The apparatus of claim 12, wherein the at least four shape makers are Christian crosses and the defined spaces for a flat cookie are fish shaped.

14. The apparatus of claim 2, wherein said plurality of retainers for retaining said U-shape frame in the horizontal position, is disposed on opposite sides of the exterior of the pan.

15. The apparatus of claim 2, wherein said plurality of retainers for retaining said U-shape frame in the horizontal position, is disposed on opposite sides of the interior of the pan.

16. An apparatus for baking a plurality of bore containing cookies for the insertion of a message, post baking, and for the simultaneous baking of flat cookies, which apparatus integrates a flat pan with spaced wall slots, a mold having a plurality of laterally connected shape makers, and the same plurality of opposed laterally connected shape makers, each shape maker having an opening in one end; the spacing of the openings corresponding to the spacing of the wall slots, and a pair of U-frames having a series of spaced aligned pins, the spacing of which pins corresponds to the spacing of the openings of the plurality of shape makers, whereby the pins of a U-frame can be inserted into the pan's wall slots and into the openings of the plurality of shape makers configured, to permit the baking of cookies with a bore therein, and wherein four shape makers, two opposed on opposite sides, define an open space for the baking of non-bore containing cookies between each pair of shape makers, said defined spaces not receiving pins.

* * * * *